United States Patent [19]

Fischer

[11] 3,898,965
[45] Aug. 12, 1975

[54] AUXILIARY FLUID INJECTION SYSTEM FOR INTERNAL COMBUSTION ENGINE

[76] Inventor: Francis A. Fischer, 464 Park Rd., West Hartford, Conn. 06607

[22] Filed: Aug. 20, 1973

[21] Appl. No.: 390,074

[52] U.S. Cl. ........ 123/75 B; 123/32 SP; 123/119 D
[51] Int. Cl. ...................... F02b 75/02; F02d 39/02
[58] Field of Search . 123/32 B, 32 C, 32 D, 33 VC, 123/124, 119 D, 191 S, 75 B, 32 ST, 32 SP

[56] References Cited
UNITED STATES PATENTS

| | | | |
|---|---|---|---|
| 820,285 | 5/1906 | Cross | 123/32 SPA |
| 910,220 | 1/1909 | Nichols | 123/32 B |
| 1,872,761 | 8/1932 | Leonard | 123/32 B |
| 2,026,321 | 12/1935 | Quick | 123/32 B |
| 2,179,143 | 11/1939 | Brown | 123/75 B |
| 2,217,942 | 10/1940 | Cairns | 123/75 B |
| 2,886,024 | 5/1959 | Elias | 123/32 B |
| 3,125,077 | 3/1964 | Monnot | 123/32 B |

*Primary Examiner*—Charles J. Myhre
*Assistant Examiner*—Ronald B. Cox

[57] ABSTRACT

A four cycle internal combustion engine is provided with a system for introducing fluid under pressure to a lower region of the combustion chamber, especially during the intake stroke of the piston. The normal gasoline and air charge enters the upper portion of the combustion chamber through a conventional intake valve, and this charge is ignited by suitable means following the compression stroke. The auxiliary fluid is introduced to the lower chamber through a conical baffle extending downwardly from the head of the cylinder, and this baffle cooperates with a conically shaped recess or cavity in the head of the piston to define the lower region of the combustion chamber. An auxiliary intake valve is provided in the cylinder head so that this auxiliary fluid may be so introduced at the proper time during the cycle of operation of the engine. Preferably, such auxiliary fluid is introduced in inverse proportion to the volume rate of flow of conventional gasoline and air charge. The ratio permits the use of an auxiliary fluid such as air to assure complete combustion of the gasoline vapor thereby improving the pollution control particularly during that phase of operation when the engine had been throttled back, as for example when a vehicle powered by such an engine is coasting downhill.

5 Claims, 5 Drawing Figures

AUXILIARY FLUID INJECTION SYSTEM FOR INTERNAL COMBUSTION ENGINE

SUMMARY OF THE INVENTION

This invention relates generally to systems for injecting auxiliary fluids into the combustion chambers of internal combustion engines of the four cycle variety, and deals more particularly with such a system wherein any unburned fuel in the combustion chamber is fully burned and discharged from the exhaust system as burnt gas rather than unburned hydrocarbon. Inefficient burning in a typical internal combustion engine is usually due to the fact that insufficient air is provided in the chamber to permit complete combustion of all fuel, especially during operation of the engine when it is throttled back, as when a vehicle powered by the engine is coasting downhill. Prolonged idling of the engine also leads to the same over rich fuel condition.

The primary aim of the present invention, therefore, is to provide a source of auxiliary fluid, such as air, which air is introduced at the proper time during the cycle of operation of a four cycle engine, preferably during the intake stroke thereof, so that this auxiliary air is available in a lower region of the combustion chamber, to assure complete combustion. This lower region comprises an auxiliary chamber which is generally isolated from the normal combustion chamber when the piston is at top dead center, but is allowed to communicate with the upper combustion chamber during the power stroke of a typical four cycle engine.

In carrying out the present invention there is provided a system for introducing fluid such as air to a lower region of the combustion chamber during the intake stroke of the engine. A source of fluid under pressure is provided to a passageway which includes a plenum chamber defined in the head of the cylinder, and a valve mechanism is provided to selectively admit air to pass from the plenum to this lower region of the combustion chamber. The cylinder head defines a depending conically shaped baffle which cooperates with a conically shaped recess in the head of the piston to define the auxiliary chamber or lower region of the combustion chamber.

DETAILED DESCRIPTION

Figure 1:
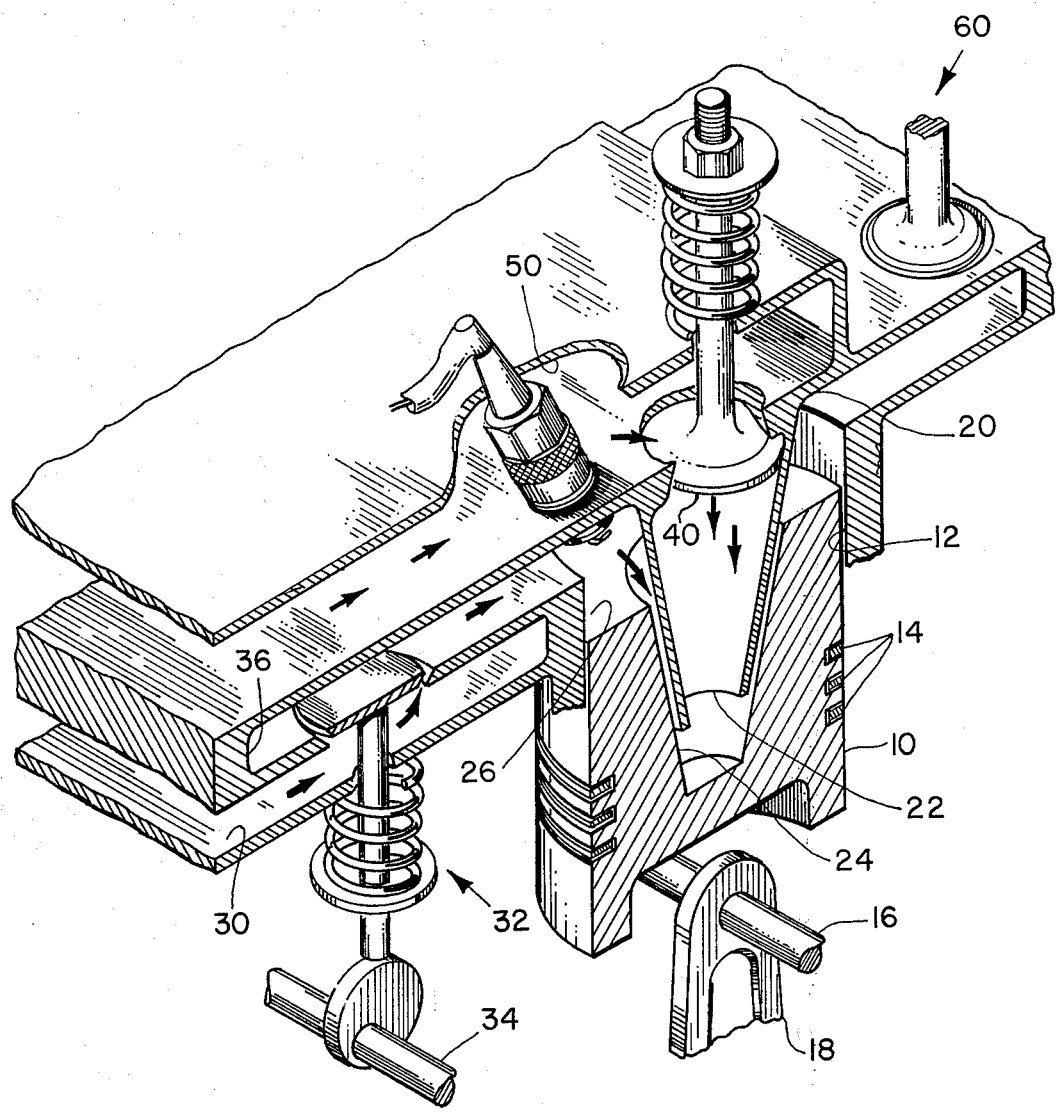
FIG. 1 is a perspective view showing in vertical cross section an internal combustion engine equipped with the elements of the present invention.

Turning now to the drawings in greater detail, FIG. 1 shows somewhat schematically one cylinder of a typical internal combustion engine of the four cycle type, such an engine having several similarly configured piston/cylinder combinations in a typical installation.

As shown in FIG. 1 a piston 10 is slidably received in a cylinder opening 12, and several piston rings 14, 14 provide a seal between the cylinder wall 12 and the exterior of the piston 10, during reciprocating motion of the piston as it oscillates in response to rotation of the crank shaft (not shown). The piston is conventionally connected to such a crank shaft by the wrist pin 16 and crank arm 18 as is conventional practice.

Figures 2, 3:
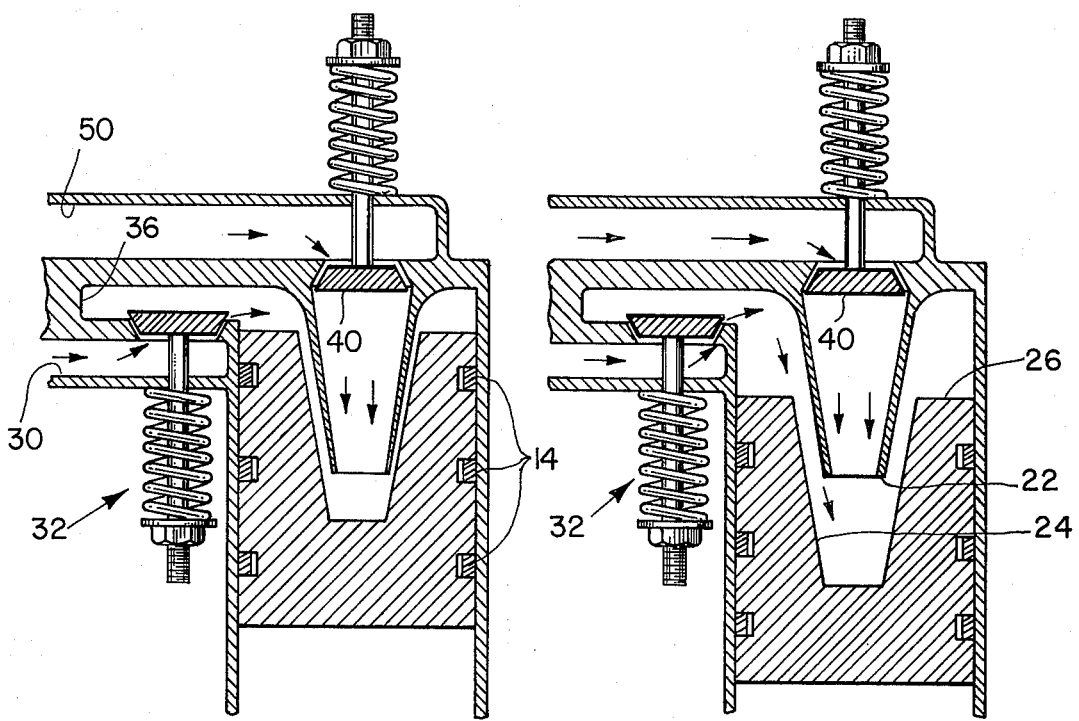
FIG. 2 is a vertical sectional view taken at substantially the same instant of time as FIG. 1, but with certain conventional elements omitted for clarity.
FIG. 3 is a vertical sectional view taken at a slightly later instant of time, but still during the intake stoke of the engine.

In accordance with the presently preferred embodiment of the invention the cylinder has an upper end wall defined in part by a cylinder head member 20, which cylinder head member 20 includes a depending conically shaped baffle 22, which baffle 22 is adapted to be received in a conically shaped opening 24 defined in the upper surface of the piston 10, and when the piston is in the top dead center position shown in FIGS. 1 and 2, the depending baffle 22 and cavity 24 cooperate to define an auxiliary chamber generally isolated from the conventional combustion chamber defined between the cylinder head 20 and the upper surface 26 of the piston 10.

Figures 4, 5:
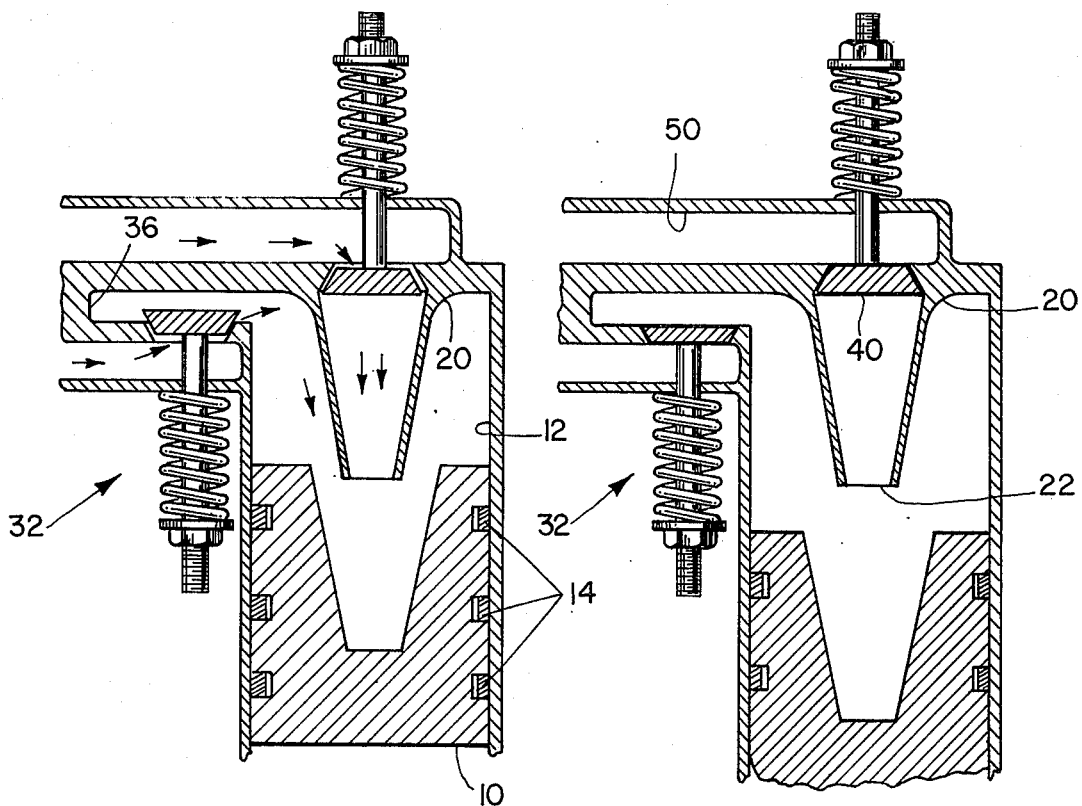
FIG. 4 is a vertical sectional view taken at a slightly later instant of time.
FIG. 5 is a vertical sectional view taken at a still later instant of time and shows the end of the intake stroke of the engine.

Conventional means is provided for introducing a fuel and air charge to the generally annular upper region of the combustion chamber defined by the upper surface 26 of the piston 10 and the underside of the cylinder head 20, and said means includes a passageway such as 30 which comprises a typical intake manifold, an intake valve assembly 32 operated from a conventional cam shaft 34 to admit the fuel and air charge to the upper or outer annular region of the combustion chamber through an intermediate passageway 36. This annular outer or upper annular region of the combustion chamber is defined in part by the cylinder wall 12, in part by the cylinder head 20, and also in part by the outer periphery of the conical baffle 22. With the intake valve 32 in the open position shown in FIG. 2, the piston 10 is at top dead center, being about to start its downward motion, or to initiate the intake stroke to draw in the fuel and air charge. This intake stroke creates a vacuum in the intake manifold and in the combustion chamber area. The resulting negative pressure in the latter area will unseat an auxiliary valve 40 as shown in FIGS. 2 and 3 allowing auxiliary fluid to be introduced into the lower region of the combustion chamber, or into the auxiliary chamber as defined between the baffle 22 and the conical cavity 24. A plenum chamber 50 is defined in the cylinder head structure for storing such auxiliary fluid for this purpose. When the piston 10 reaches its lower limit of travel, or bottom dead center as shown in FIG. 5, the auxiliary valve 40 will close permitting the charge to be compressed prior to combustion. After reaching the FIG. 5 position, it will be apparent that a good deal of the auxiliary fluid will escape the auxiliary chamber, and pass upwardly between the outside of the baffle 22 and the wall of the conical cavity 24. Where the auxiliary fluid is air the mixture to be burned will be considerably leaner, but this effect is tempered by the fact that in an automotive vehicle powered by an engine of this type, this tendency to provide a leaner than normal mixture will be most felt when the intake vacuum is highest, or when the vehicle is coasting downhill or idling. When the engine is delivering power to the vehicle, especially during long uphill grades for example, the intake vacuum is closer to atmospheric pressure and the effect less marked. Thus, it is chiefly in this former situation that the auxiliary fluid, in the form of air under pressure, will have the desirable effect of assuring that the gasoline introduced through the intake system is in fact completely burned before being exhausted through the conventional exhaust valve means, shown generally at 60 in FIG. 1.

Preferably, and as shown in the drawings, the auxiliary valve 40 is not operated from a cam shaft or the like, but rather is self operated in response to the difference in pressure between the plenum chamber 50 and the combustion chamber. A spring 42 acts between a flange 44 on the valve element 46 and fixed structure to urge the valve element 46 toward its closed position. However, when the vacuum pressure in the combustion chamber exceeds some predetermined valve, then this spring force will be overcome and the auxiliary valve will open to admit auxiliary fluid as described above. It will be apparent to those skilled in the art to which this invention pertains that the valve 40 might be operated by other more complete means within the scope of the present invention. For example, the valve 40 might be operated under the control of the throttle so that more auxiliary fluid or air is introduced when the throttle is closed and proportionately less auxiliary fluid or air when the throttle is opened. This inverse relationship would serve much the same purpose as the above described self-operated valve 40. Still other means for operating this valve might be devised without departing from the scope of my invention.

Although the foregoing description assumes that the auxiliary fluid supply is air, and although air is useful in assuring complete combustion of the fuel and air charge especially during idling of an internal combustion engine, and when the vehicle powered by such an engine is coasting at high speed, it will also be apparent that other fluids might also be introduced through the valve 40 to the lower region of the combustion chamber defined by the baffle 22 and the conical cavity 24 in the piston. For example, water vapor might be introduced to this region in order to cool the internal area of the combustion chamber and hence improve the heat distribution characteristics in the engine and thereby achieving a more complete combustion during normal power levels of operation of the engine. Other fluids might also be introduced through this system, either in the form of inert gases, or combustible gases, should it be desirable to derive greater power from the engine than is the case during normal operation.

I claim:
1. An internal combustion engine comprising:
   a. at least one cylinder,
   b. a cylinder head for said cylinder including an annular baffle extending downwardly from the remainder of said head into said cylinder,
   c. a piston slidably received in said cylinder and having a recess in its upper portion to receive said baffle when said piston is in its top dead center position; said cylinder, cylinder head, baffle and piston, when said piston is in its top dead center position defining an annular combustion chamber surrounding the outside of said baffle; and said baffle and said piston, when said piston is in its top dead center position, defining an auxiliary chamber surrounded by said baffle and generally isolated from said combustion chamber; the length of that portion of said baffle which is received in said piston recess when said piston is in its top dead center position being greater than one-half of the stroke of said piston,
   d. an intake valve means communicating directly with said combustion chamber for introducing a fuel and air charge to said combustion chamber,
   e. an exhaust valve means communicating directly with said combustion chamber for carrying away spent gases of combustion from said combustion chamber,
   f. a passageway for delivering an auxiliary fluid to said auxiliary chamber, and
   g. an auxiliary valve means in said cylinder head between said passageway and said auxiliary chamber for controlling the flow of auxiliary fluid from said passageway to said auxiliary chamber.

2. The combination of claim 1 further characterized in that said depending baffle more particularly comprises a hollow conically shaped member of annular cross section open at its lower smaller end and defining a valve seat in its upper end for said auxiliary valve means.

3. The combination of claim 1 further characterized in that said recess in said piston upper surface more particularly comprises a generally conically shaped cavity for receiving said depending baffle, said baffle having an open lower end which is of circular cross section to be received in said conical cavity.

4. The combination of claim 3 wherein said baffle comprises a hollow conical member of annular cross section and defining said circular open end at its smaller end, said baffle having a valve seat in its upper end for said auxiliary valve means.

5. The combination of claim 4 further characterized by biasing means for urging said auxiliary valve means toward a closed position wherein said valve means is seated on said valve seat in the upper end of said conical baffle, and means for adjusting the biasing force of said valve biasing means so that said valve remains closed except during a portion of the intake stroke of said piston.

* * * * *